United States Patent [19]

McGaughey

[11] 4,278,484

[45] Jul. 14, 1981

[54] PNEUMATIC SIDE WALL BONDING IN RADIAL TIRE MANUFACTURE

[75] Inventor: Robert S. McGaughey, Indiana, Pa.

[73] Assignee: McCreary Tire & Rubber Company, Indiana, Pa.

[21] Appl. No.: 107,265

[22] Filed: Dec. 26, 1979

[51] Int. Cl.³ .............................. B29H 17/18

[52] U.S. Cl. .............................. 156/123 R; 156/132; 156/401; 156/421

[58] Field of Search .............. 156/132, 133, 400, 401, 156/402, 408, 416, 421, 123 R

[56] References Cited

U.S. PATENT DOCUMENTS

| | | | |
|---|---|---|---|
| 3,409,491 | 11/1968 | Pacciarini et al. | 156/126 |
| 3,438,832 | 4/1969 | Cantarutti | 156/132 |
| 3,560,301 | 2/1971 | Cantarutti | 156/401 |
| 3,692,605 | 9/1972 | Cantarutti | 156/132 |
| 3,698,987 | 10/1972 | Woodhall et al. | 156/401 |
| 3,833,444 | 9/1974 | Mallory | 156/400 |
| 4,145,238 | 3/1979 | Bottasso et al. | 156/132 |

*Primary Examiner*—John E. Kittle

*Attorney, Agent, or Firm*—Buell, Blenko, Ziesenheim & Beck

[57] ABSTRACT

In the two-stage manufacture of radial ply tires, the sidewall stock is applied to the cylindrical tire body on a mandrel so as to overlie the turned over ply ends and extend beyond them, and while the mandrel is stationary, the sidewalls are bonded to the underlying plies by inflating bladder assemblies so as to cause them to press the sidewall stock against the underlying plies.

3 Claims, 4 Drawing Figures

PNEUMATIC SIDE WALL BONDING IN RADIAL TIRE MANUFACTURE

This invention relates to the two-stage manufacture of radial pneumatic tires. It is more particularly concerned with a method for bonding the sidewall stock to the tire body in the first stage of that process.

BACKGROUND OF THE INVENTION

Bias ply tires are conventionally made in a single stage process on a cylindrical mandrel. The plies of rubberized fabric, reinforcing cord and tire tread are all applied in proper order to the mandrel while it rotates and the cylindrical tire body so formed is then shaped in a steam press. Radial tires cannot be built up in that manner because the reinforcing cords or wires run more or less longitudinally of the mandrel and are laid on a substantially inextensible breaker band or belt. There are two commercial methods of making radial tires, called the single stage and the two-stage process respectively.

In the single stage process the underlying tire body is built up on a cylindrical, but expansible, rotating mandrel, the mandrel is then expanded in its central portion, generally by moving its ends toward each other, so as to convert the cylindrical tire body into a torus, and the breaker band, cords and tread are applied to that torus. A single stage machine and the process of tire building employing it are described in Cantarutti U.S. Pat. No. 3,560,301. In the two-stage process, with which this invention is concerned, the underlying tire body is built up on a cylindrical mandrel. The reinforcing cords, tread and breaker band are built up as a separate torus. The underlying body is then transferred to a tire shaping machine which expands the cylindrical body in its central portion in the way previously mentioned, the expanded torus is slipped over the underlying tire body before it is expanded, and the latter is then expanded against the cord and tread torus.

The first stage of the two-stage radial tire building process as generally practiced is quite similar to the corresponding portion of bias ply tire building, which is set out, for example, in Cantarutti U.S. Pat. No. 3,438,832. The ends of the plies which overlie the ends of the mandrel are turned down, the bead ring is applied thereto and the ply ends are turned up around the rings and over against the underlying plies by air-inflated double bladder assemblies at each end of the machine. These bladders inflate rapidly and actually snap the ply ends against the underlying tire body. This is done with the mandrel stationary. After the bladders have been retracted, the mandrel is rotated and stitcher wheels, also shown in the Cantarutti patent, which travel from the center of the mandrel outwardly toward each end, are utilized to press the ply ends against the underlying plies in a spiral pattern as the mandrel rotates. Sidewall stock is manually applied to the mandrel while it rotates, and is stitched with the same stitcher wheels.

In the single stage process, the ply ends are turned up around the bead rings by an inflatable double bladder assembly at each end like those used in bias ply tire building machines and in the first stage of two-stage radial tire building. However, those bladder assemblies are rotatable. The sidewall stock is laid out on the collapsed bladder assemblies while they are rotated, and is applied to the torus by inflating the bladders, thus lifting the sidewall stock and carrying it against the side of the torus, which is only a few degrees from vertical. Because of the relatively upright position of the torus wall, the bladders do not have to move any great distance axially of the mandrel. It is additionally advantageous to carry out this operation while the mandrel and bladder assemblies are both rotating, as the centrifugal force of rotation assists the air pressure throwing the bladders up against the torus. The sidewalls are then usually stitched mechanically to the torus by stitcher wheels.

A bias ply tire building machine does not require an expansible mandrel, but the mandrel of a tire building machine for radial tires by the single stage process, must be expansible. This expansion is conventionally accomplished by causing the mandrel ends to approach each other, so bulging the mandrel central portion. It has been found that in applying sidewall stock to the tire body in the single stage process on such a mandrel in the way outlined above, the stock tends to creep, and furthermore air bubbles are sometimes entrapped between sidewall stock and the underlying plies.

SUMMARY OF THE INVENTION

I have discovered that the problems above mentioned appear to stem from the use of stitcher wheels with an expansible mandrel. I have found that as the wheels travel along the rotating mandrel, the centrifugal force of rotation acts to separate the sidewall stock from the underlying plies, so that the travel of the stitcher wheels tends to shift the sidewall stock longitudinally and the entrapped air is not entirely squeezed out. I have further discovered that although in the first stage of the two-stage process the sidewall stock extends inwardly from the ends of the cylindrical tire body an appreciably greater distance than the ply ends, so that much greater bladder travel is required than has heretofore been thought possible, that stock can be effectively bonded to its underlying plies while the mandrel is stationary by the use of inflated bladders alone.

DESCRIPTION OF PREFERRED EMBODIMENT

Figure 1:
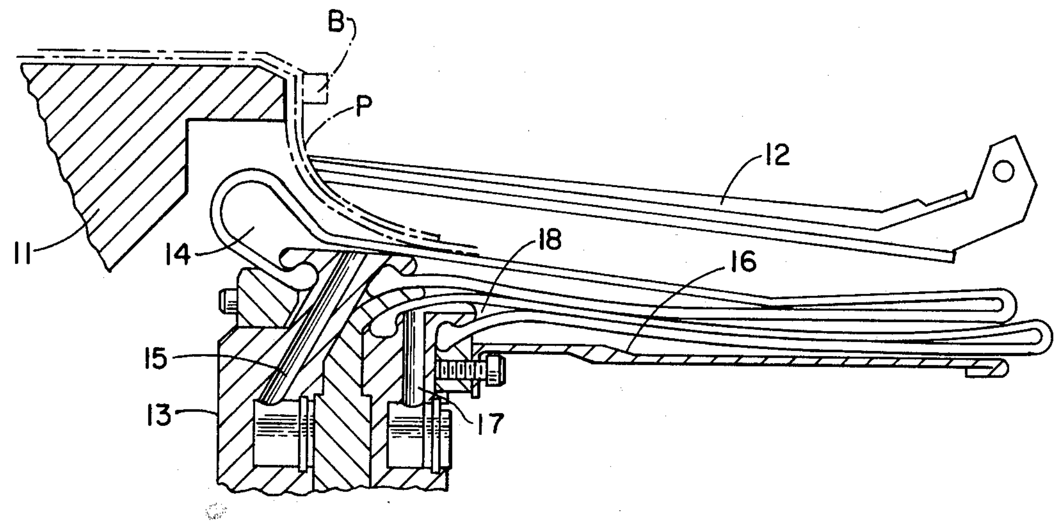
FIG. 1 is a sectional view of a portion of a tire building machine for the first stage of the two-stage process of radial tire building.
Figure 2:
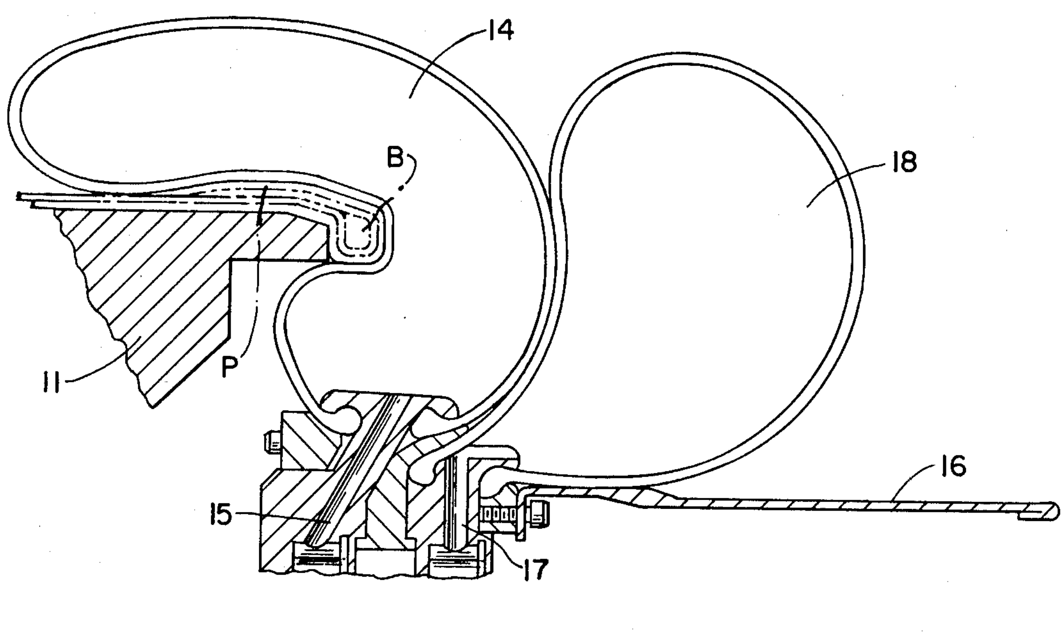
FIG. 2 is a sectional view of the portion of the machine of FIG. 1 with bladders inflated.

As I have mentioned, a tire building machine for the first stage of the two-stage process of building radial tires comprises a mandrel, 11 in the figures, on which are laid up the underlying plies of rubber and rubberized fabric in the conventional way. The plies extend beyond the ends of the mandrel, as at P in the figures. Ply turndown fingers 12 are then actuated to turn the ply ends P down over the ends of the mandrel 11 as in FIG. 1. Bead rings B are positioned against ply ends P where they abut the end of mandrel 11, and as the ply material is tacky the bead rings stay in place. The machine is equipped with an outer bladder 14 and an inner bladder 18, which in the deflated condition lie flat against each other on bladder support cylinder 16 as shown in FIG. 1. Bladders 14 and 18 are formed as annuli, their inside edges being held in a bladder mounting ring assembly 13 which is formed with an air passage 15 opening into bladder 14 and a second air passage 17 opening into bladder 18. With the mandrel 11 stationary, those bladders are inflated as in FIG. 2 and turn the ply ends P up over the bead ring B and against the underlying plies on the mandrel.

Figure 3:
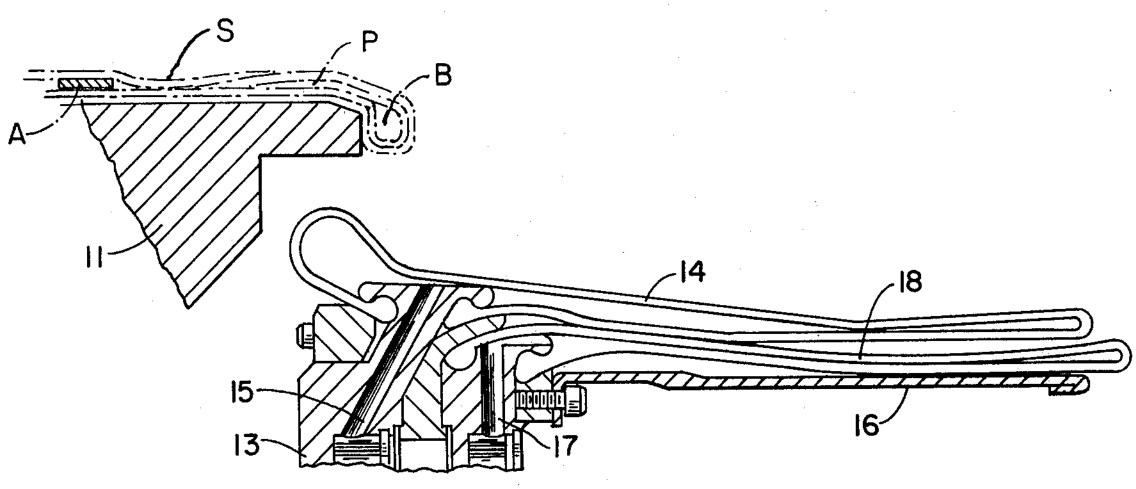
FIG. 3 is a sectional view of the same portion of the machine of FIG. 1 with the sidewall stock applied to the underlying plies.
Figure 4:
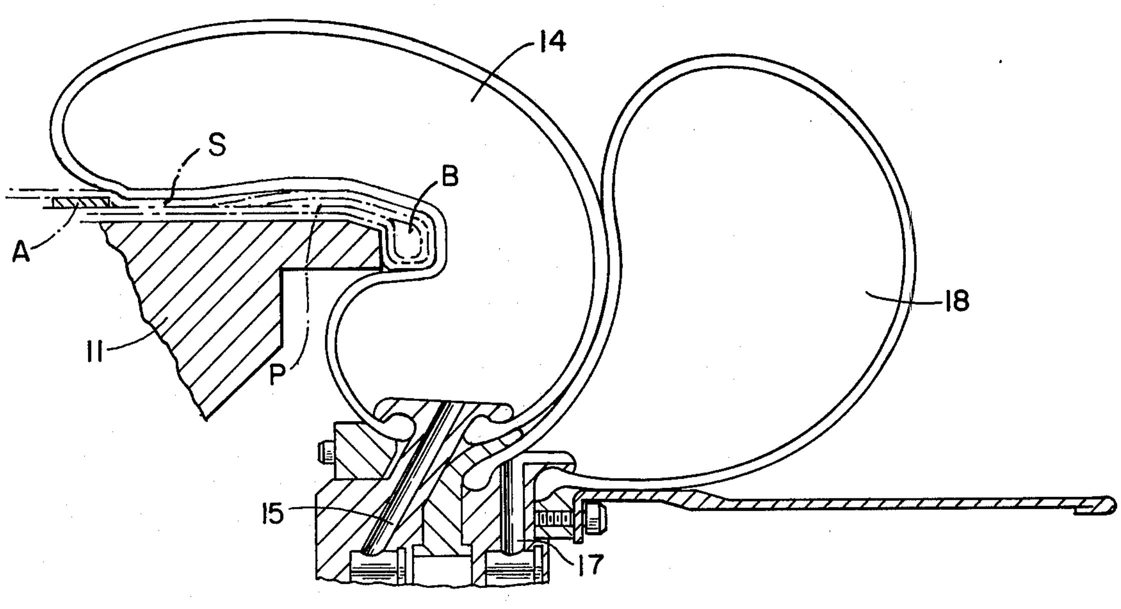
FIG. 4 is a sectional view of the same portion of the machine as shown in FIG. 3 with the bladders inflated.

The bladders are then deflated and sidewall stock S is applied to the tire body on the mandrel while the latter is revolved. The sidewall stock may overlap the ply ends P and extend beyond those ply ends inwardly of mandrel 11, as in FIG. 3. Between the inner edge of sidewall stock and the underlying plies a separator or barrier strip A is placed to prevent bonding of the sidewall stock to those plies in that area. Strip A may be of any material to which the tacky rubber will not adhere. The mandrel is again stopped and bladders 14 and 18 are again inflated, pressing the sidewall stock S against the underlying plies as is shown in FIG. 4, and bonding it thereto.

The cords, tread and breaker band are built up as a separate torus in the conventional way so that the torus can be slipped over the cylindrical tire body of the first stage process. That body is then placed on the expansible mandrel of a tire shaping machine and the torus is slipped over it. The barrier strip is removed so that the sidewall stock S, so uncovered, is in contact with the torus and the mandrel is then expanded sufficiently to force the underlying body against the interior of the torus. The uncovered edge of the sidewall stock is sufficiently tacky to adhere to the torus, and the edges of the latter are bonded between the tire body and the sidewall edge.

The bladders suitable for my process herein described are necessarily considerably longer or deeper than those conventionally used, to effect the longer travel corresponding to the width of the sidewall stock. Those bladders, therefore, require more time to inflate than conventional ply turn-up bladders and impinge on the sidewall stock more gradually and without the benefit of the sudden impact of the latter. The effective sidewall stitching obtained by my process is beyond that which the prior art would indicate to be possible.

I claim:

1. In the manufacture of pneumatic tires on a mandrel wherein the underlying tire body is built up on the mandrel, bead rings are applied to that body at the ends of the mandrel and the ply ends are turned up around the bead rings and over the tire body by inflating retractable bladders, the improvement comprising applying sidewall stock to the tire body over and beyond the ply ends while the mandrel is rotating so as to form a cylindrical layer thereon, stopping the mandrel, and while the mandrel is stationary again inflating the bladders to extend them over and against the sidewall beyond the turned over ply ends on the mandrel, thereby bonding the sidewall onto the underlying plies without the use of other means.

2. The process of claim 1 including the step of placing a separating strip under the inside edge of the sidewall stock prior to the inflation of the bladders so as to prevent bonding of that edge to the underlying tire body.

3. The process of claim 2 including the positioning of a preformed cord, tread and breaker band torus over the tire body on a shaping mandrel with the inner edge of the sidewall stock overlapping the torus, removing the separating strip, and expanding the mandrel so as to force the tire body against the torus, thereby bonding the edge of the latter between the tire body and the sidewall edge.

* * * * *